United States Patent [19]

Weston et al.

[11] 4,402,547
[45] Sep. 6, 1983

[54] POWER RECLINER WITH INERTIA LATCH

[75] Inventors: Allen H. Weston, Marshall, Mich.; Bernd A. Klueting, Radevormwald, Fed. Rep. of Germany

[73] Assignee: Keiper U. S. A., Inc., Battle Creek, Mich.

[21] Appl. No.: 181,480

[22] Filed: Aug. 26, 1980

[51] Int. Cl.³ .................. B60N 1/02; A47C 1/025
[52] U.S. Cl. ................................ 297/379; 297/216; 297/362
[58] Field of Search .............. 297/362, 378, 379, 330, 297/216

[56] References Cited

U.S. PATENT DOCUMENTS

| | | | |
|---|---|---|---|
| 1,791,765 | 2/1931 | Saunders et al. | 297/378 X |
| 3,203,731 | 8/1965 | Krueger | 297/378 X |
| 3,972,564 | 8/1976 | Arlanskas et al. | 297/379 X |
| 4,143,913 | 3/1979 | Rumpf | 297/379 |
| 4,147,386 | 4/1979 | Stolper | 297/362 |
| 4,165,128 | 8/1979 | Strowick et al. | 297/379 X |
| 4,195,881 | 4/1980 | Kluting et al. | 297/362 |
| 4,219,234 | 8/1980 | Bell | 297/379 |
| 4,223,946 | 9/1980 | Kluting | 297/379 X |
| 4,304,386 | 12/1981 | Nagashima et al. | 297/362 X |

Primary Examiner—William E. Lyddane

[57] ABSTRACT

Power recliner with inertia latch for automotive vehicle seat including lower seat taumel, upper taumel and upper back hinge brackets with spaced pivotal connections providing power taumel adjustment of seat back angle and inertia latch controlled forward dumping of seat back with manual override.

7 Claims, 9 Drawing Figures

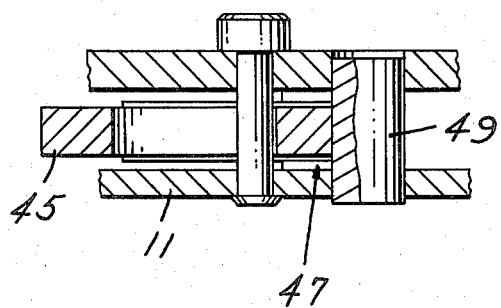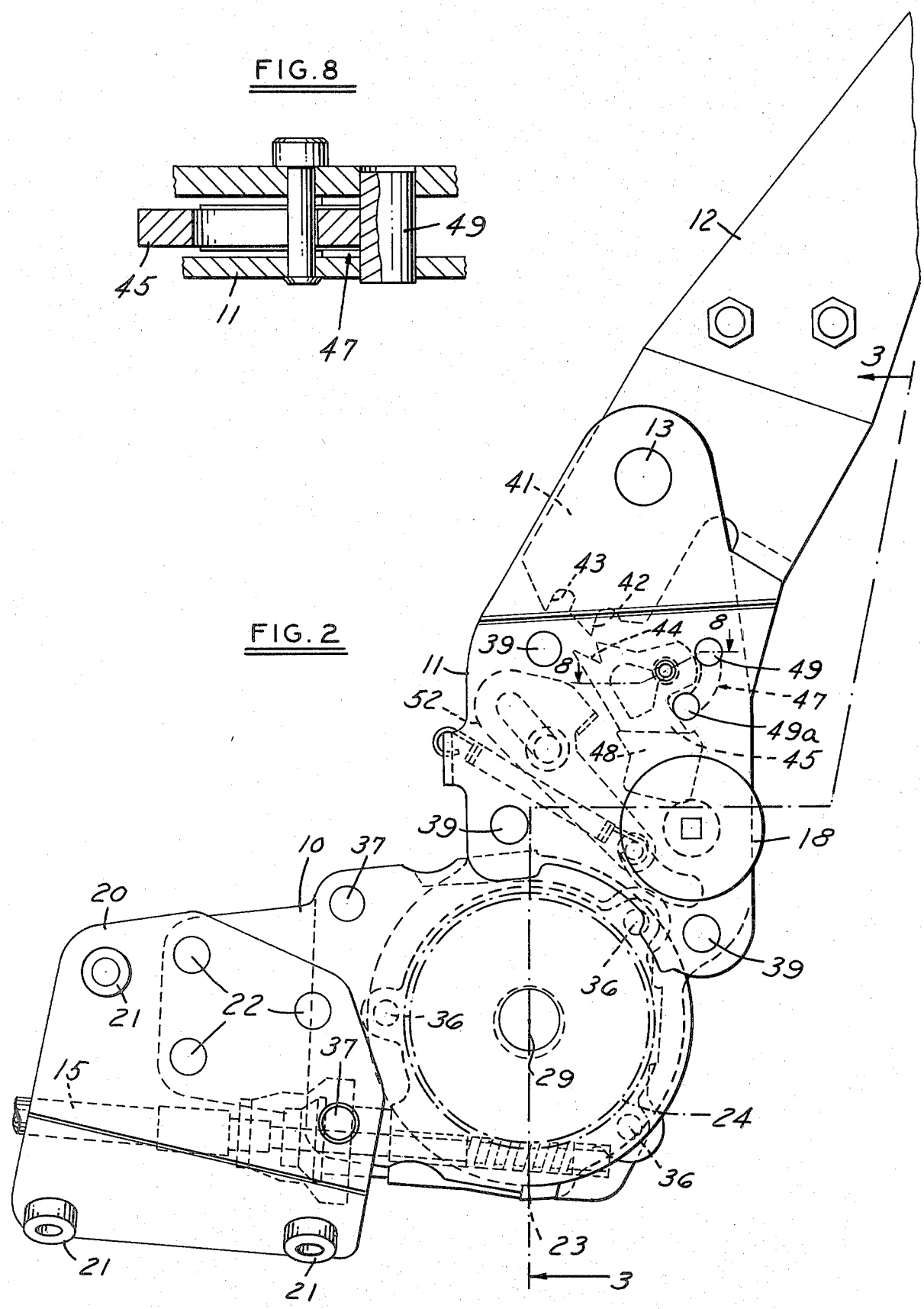

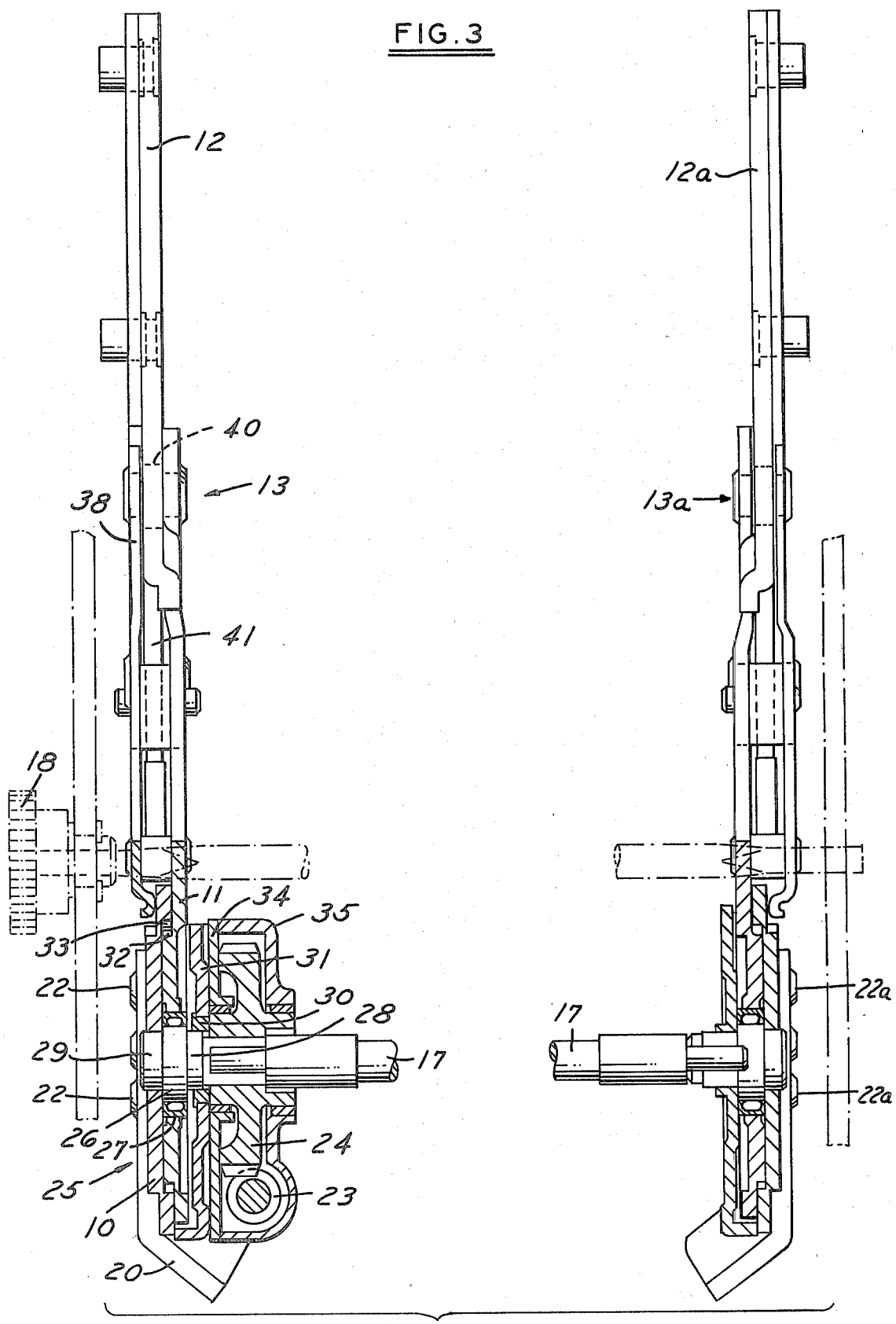

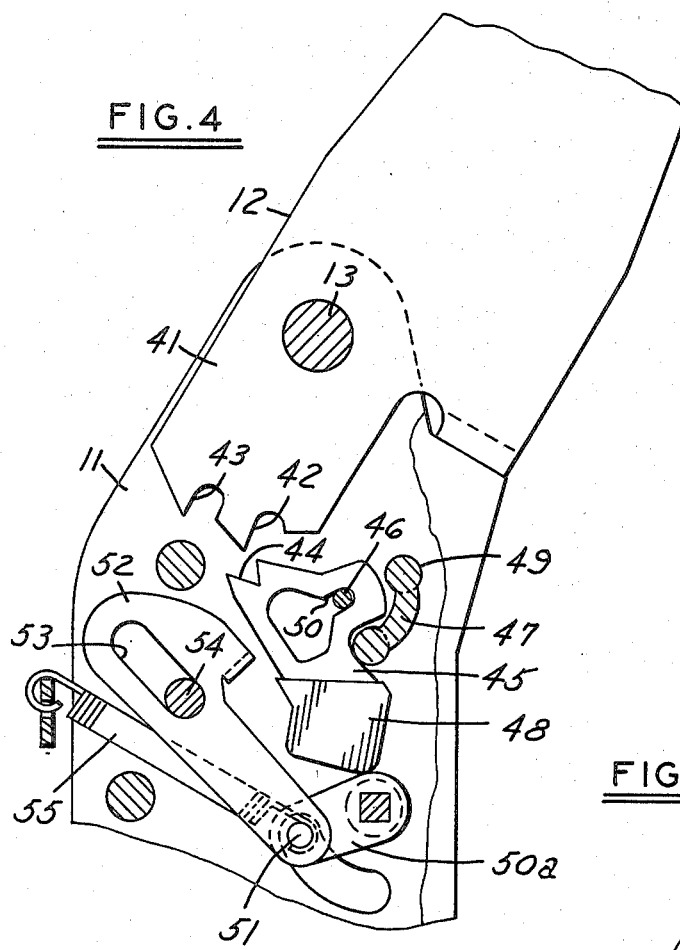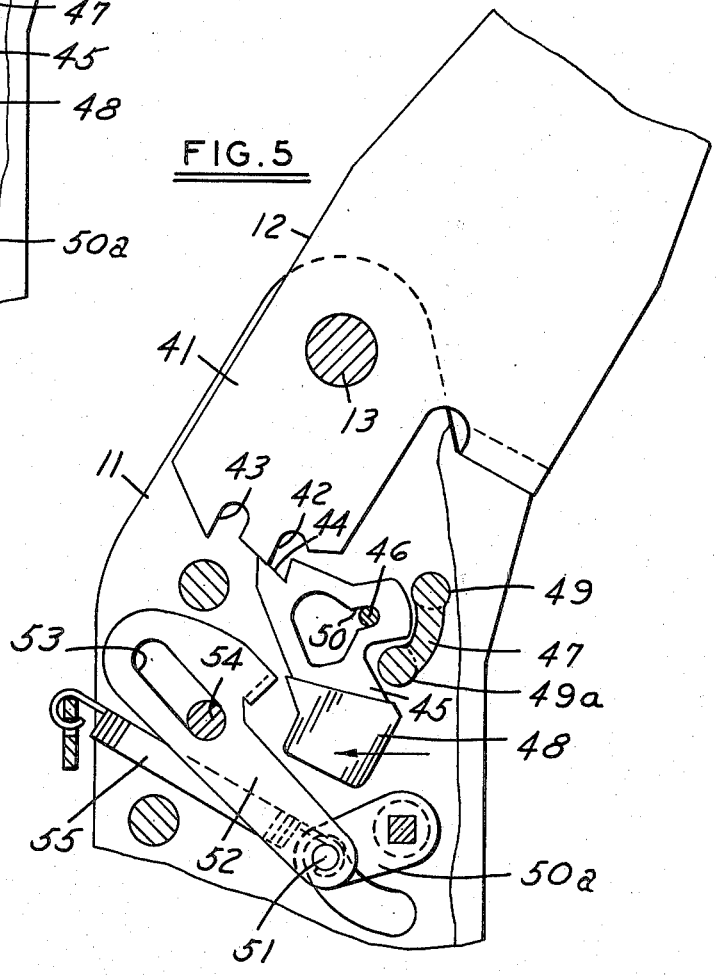

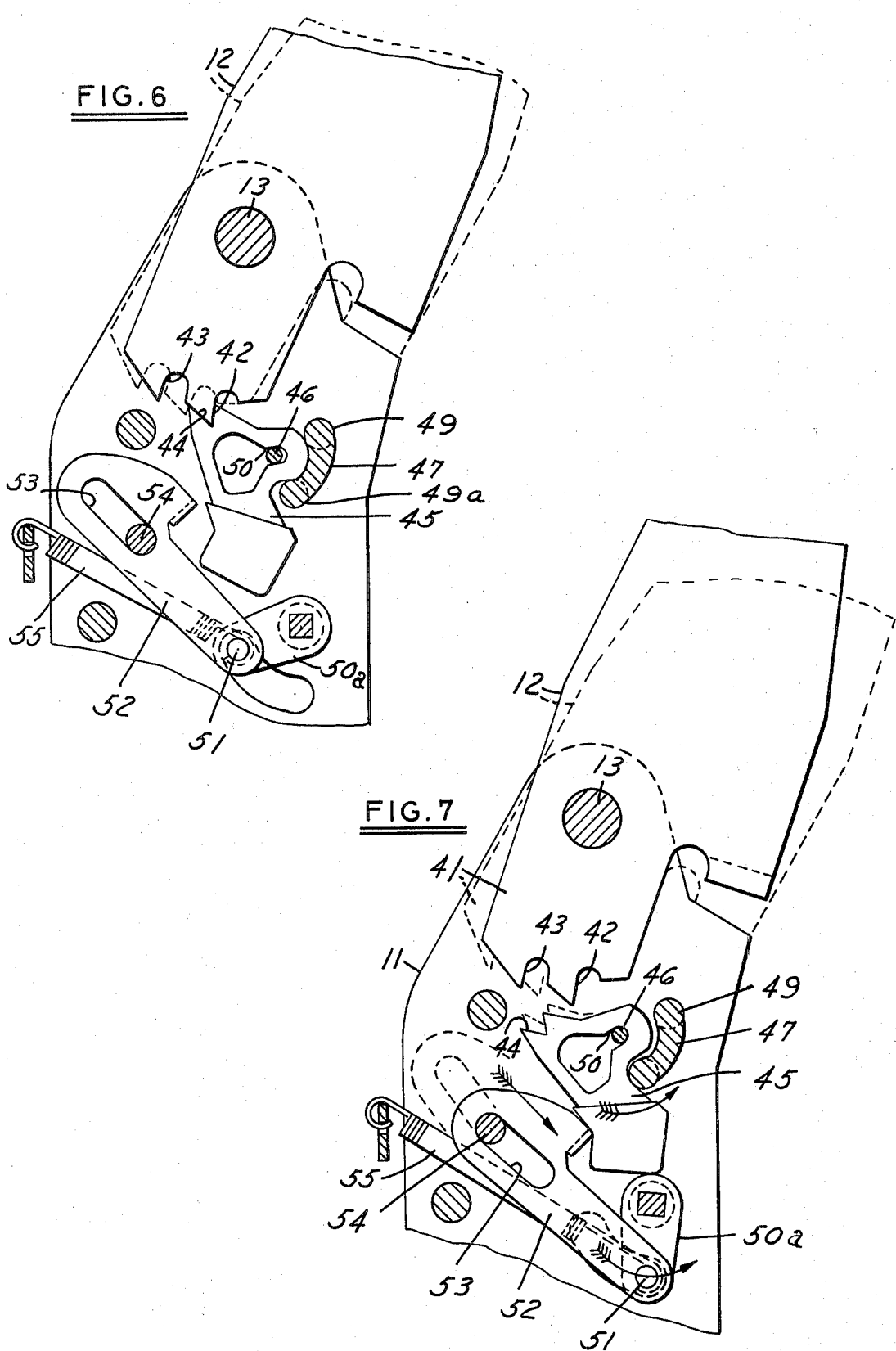

POWER RECLINER WITH INERTIA LATCH

BACKGROUND OF THE INVENTION

Power adjusted seats are known such as "six-way" power seats currently in use on certain passenger cars and power spindle drives for adjusting the angle of a vehicle seat back through power spindle actuation of an extension of a seat back hinge member which is pivotally connected to a lower seat bracket.

In a co-pending U.S. patent application Ser. No. 172,161 filed on July 25, 1980 a power seat back recliner operating through a "Taumel" adjuster is disclosed wherein an electric motor drives through a flexible cable a worm and worm gear, taking the place of the conventional manual adjustment knob, with a 45:1 reduction in the worm gear and a 30:1 reduction in the taumel unit providing 1350:1 overall reduction. No separate pivotal dump feature for the seat back is disclosed in such application.

SUMMARY OF THE PRESENT INVENTION

The present invention combines the power actuated Taumel feature of said co-pending application with an inertia latch seat back dump feature permitting the seat back to be manually tilted forward in the absence of sudden vehicle deceleration which actuates an inertia responsive latch to prevent forward seat back tilting. A manual override feature is provided for the inertia latch in the event of its inoperativeness for any reason when seat back forward tilting is desired. The inertia element of the latch is mounted on an upper Taumel bracket member which is pivotally attached at its lower end to the lower Taumel seat bracket and at its upper end to a seat back bracket. A special feature of the inertia latch is a light-duty low friction pivotal connection having lost motion to permit reaction engagement of the inertia element with a heavy-duty back up element upon latch engagement under sudden deceleration impact loads. A manually rotatably knob actuates linkage to override the inertia latch if necessary. An elevated pivot for seat back dumping permits the back to pivot forwardly to a level flush relation with the seat cushion for maximum clearance as in loading packages over the seat back into a rear compartment.

BRIEF DESCRIPTION OF THE DRAWINGS

FIG. 2 is an enlarged side elevation of one of the seat hinges which receives the electric motor drive through a flexible cable;

FIG. 3 is a sectional end elevation of a pair of seat hinges such as illustrated in FIG. 1 taken along the line 3—3 of FIG. 2;

FIG. 4 is a fragmentary sectional side elevation of the inertia latch mechanism shown in phantom in FIG. 2 with the cover removed;

FIG. 5 is a fragmentary view similar to FIG. 4 showing the latch closed by inertia with the seat at the rear stop;

FIG. 6 is a fragmentary view similar to FIG. 5 showing the seat back slightly forward with the inertia latch locked;

FIG. 7 is a fragmentary view similar to FIG. 6 showing the inertia latch closed and being opened with an override feature;

FIG. 8 is an enlarged fragmentary view taken along the line 8—8 of FIG. 2;

DETAILED DESCRIPTION OF THE PREFERRED EMBODIMENT

Figure 1:
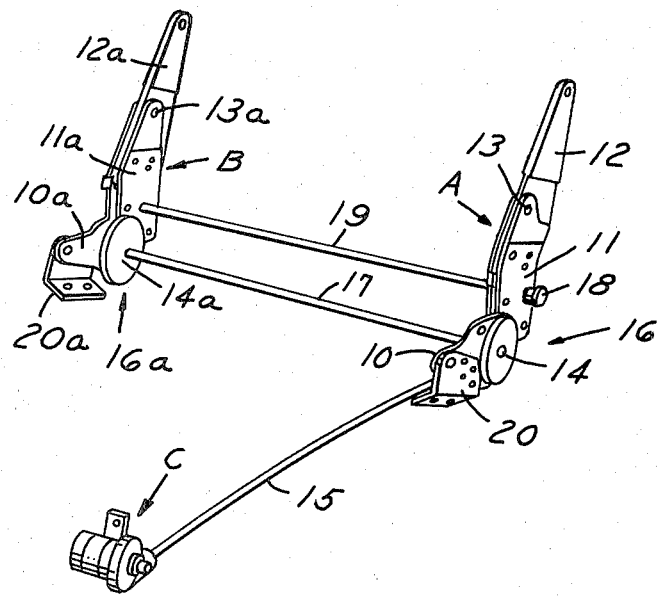
FIG. 1 is a perspective somewhat diagrammatic view of the complete inertia latch power recliner system including electric motor drive for a pair of adjustable seat hinges.

With reference to FIG. 1 the present inertia latch power recliner system includes main taumel hinge unit A, slave hinge unit B, and electric motor drive C. The main hinge has seat attachment bracket 10, upper taumel bracket 11 and seat back attachment bracket 12 with pivotal connection 13 between the lower seat back and upper taumel brackets and pivotal connection 14 between the upper taumel and seat back brackets. Slave hinge B has similar lower taumel seat bracket 10a, upper taumel bracket 11a, and seat back bracket 12a with like pivots 13a and 14a.

In general the operation of the system is through electric motor C driven flexible cable 15 driving taumel adjustment unit 16 connected by cross rod 17 to taumel unit 16a for adjusting hinge B. An inertia latch, as hereinafter described, is provided with manual override actuated by knob 18 and through cross rod 19 to a similar override for the inertia latch in hinge B.

With reference to FIGS. 2 and 3 bracket 10 is secured to a lower seat frame through angle bracket 20 having attachment apertures 21. Bracket 10 is rigidly secured to angle bracket 20 by three rivets 22 and bracket 10a is similarly secured to angle bracket 20a by three rivets 22a.

Adjustment drive of upper taumel bracket 11 relative to lower taumel seat bracket 10 is effected by flexible cable 15 driving worm 23, worm gear 24 keyed to rod 17 and eccentric bolt 25 having a cylindrical eccentric 26 piloted in needle bearing 27 in upper taumel bracket 11. Cylindrical journals 28, 29 on either side of eccentric 26 in alignment with the axis of worm gear 24 are piloted respectively in bushing 30 in backing plate 31 and in lower taumel bracket 10. External gear teeth 32 formed on the upper taumel bracket mesh with internal gear teeth 33 formed in the lower taumel bracket which is sufficiently larger in diameter to provide one extra tooth which through actuation of worm 23 causes a one tooth relative progression in the adjustment angle of the upper taumel bracket for each revolution of eccentric 26. Thus with 30 and 29 teeth respectively a ratio of 30:1 is provided in the taumel unit which together with a 45:1 ratio in the worm to worm gear provides a 1350:1 overall ratio in the driven from flexible cable 15.

Backing plate 31, housing cover 34 and gear housing 35 are assembled with three bolts 36 and backing plate 31 is in turn secured to lower taumel bracket 10 by fasteners indicated at 37. Seat back attachment bracket 12 is sandwiched between upper taumel bracket 11 and cover plate 38 secured thereto by fasteners indicated at 39 with pivotal attachment 13 comprising a shouldered rivet with spacing established by larger center portion 40.

Figure 9:
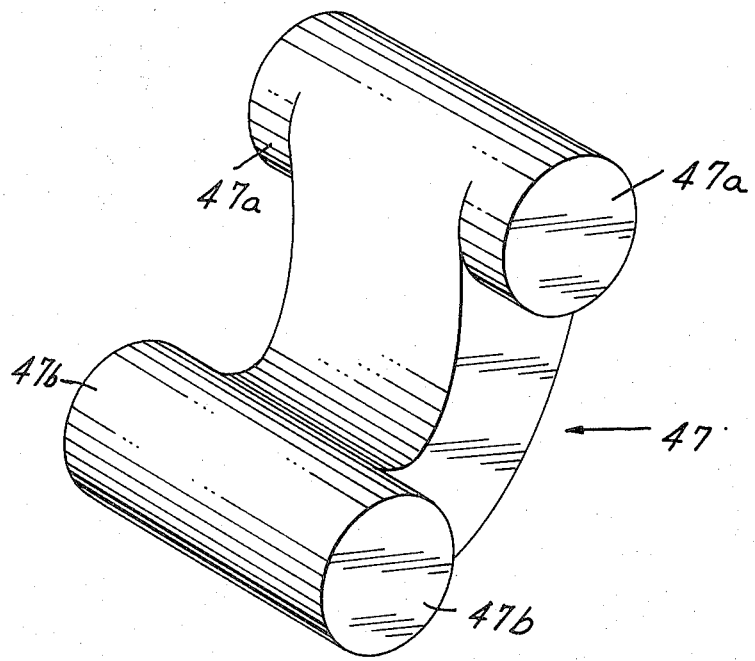
FIG. 9 is a further enlarged perspective view of the back up member for the inertia element of the latch.

Lower extension 41 of seat back bracket 12 includes a pair of latch projections 42, 43 engageable within inertia latch recess 44 formed in the end of inertia latch 45 pivotally suspended on small diameter plastic latch pivot 46 in a normally clearing position, as shown in FIG. 4, which will permit the seat back bracket 12 with attached seat back to be manually tilted to a forward position when the vehicle is stationary or otherwise free of inertia force arising from sudden deceleration of the vehicle. Upon sudden deceleration, inertia latch 45 swings to a latching orientation as shown in FIG. 5 whereupon forward tilting of the seat back is arrested, as illustrated in FIG. 6, at which time latch 45 moves back into reaction engagement with latch support 47 (illustrated in large perspective in FIG. 9) anchored at upper ends 49 and lower ends 49a in respective upper taumel bracket 11, cover plate 38 (FIG. 3), such movement being permitted by the slotted opening 50 in inertia latch 45. This is an important feature of the latch system which permits small diameter plastic latch pivot 46 to be employed with minimum pivot frictional resistance to free gravity and inertia swinging of the inertia latch without incurring impact loading on the pivot. A molded plastic sleeve 48 covering the lower end of the latch 45 provides a low friction guide for spacing the latch for free pivotal swinging within the upper taumel bracket and cover plate.

As an override for manual disengagement of latch 45, external knob 18 (FIG. 3) operating through bellcrank linkage 50a pivoted at 51 to slide link 52 having slotted opening 53 engaging guide pin 54 provides for manual retraction of latch 45 as shown in FIG. 7 against the preload of tension spring 55.

A relatively high location of pivot 13 as illustrated may be employed to accommodate forward tilting of the seat back to a fully horizontal position in order to facilitate package loading into the rear compartment.

We claim:

1. Hinged adjustable bracket system with inertia latch for an automobile seat comprising a first taumel hinge bracket for fixed attachment to a seat, a second taumel hinge bracket adjustably connected with taumel gearing to said first taumel hinge bracket, a bracket for fixed attachment to a seat back with means for accommodating pivotal movement relative to said second taumel hinge bracket, stop means for limiting backward pivotal movement of said seat back relative to any adjusted operative position of said second taumel hinge bracket, inertia latch means for arresting forward tilting of said seat back upon sudden deceleration and otherwise permitting said forward tilting and manual overriding slide means for actuating said inertia element to a release position comprising a rotatable knob, bellcrank and slide resiliently biased to an inoperative position, with means projecting from said slide for actuating said inertia element to an unlatched position upon manual rotation of said knob.

2. The system of claim 1 including power taumel gear actuating means for adjusting the operative position of said second taumel hinge bracket.

3. The system of either claim 1 or 2 including an inertia element of said latch means with a pivotal mounting and a reaction stop separate from said pivotal mounting for absorbing latch loads incident to arresting seat movement.

4. A system as set forth in claim 3 wherein said inertia element is mounted on said second taumel hinge bracket in a normally released orientation relative to an engageable latch element on said seat back bracket.

5. A system as set forth in claim 1 including a pivotal connection between said seat back attachment bracket and said second taumel hinge bracket spaced above the operating axis of said taumel gearing to accommodate forward seat back tilting to a horizontal position.

6. A system as set forth in claim 1 including power and slave taumel gear actuating units for brackets attached on either side of a seat with an interconnecting drive shaft therebetween.

7. A system as set forth in claim 6 including interconnecting means for actuating the manual override means for releasing the inertia element on respective units for either side of the seat.

* * * * *